United States Patent [19]

Mathisen

[11] 4,198,656

[45] Apr. 15, 1980

[54] VIDEO SEQUENCER-PROCESSOR

[75] Inventor: William D. Mathisen, Rancho Palos Verdes, Calif.

[73] Assignee: Pelco Sales, Gardena, Calif.

[21] Appl. No.: 625,598

[22] Filed: Oct. 24, 1975

[51] Int. Cl.² ............................................. H04N 5/76
[52] U.S. Cl. .................................... 358/127; 358/108;
        360/10; 360/35; 360/37
[58] Field of Search ................ 178/DIG. 22, DIG. 1,
        178/DIG. 38, 6.6 R, 6.6 DD, 6.6 A; 360/10, 11,
        35, 19, 49, 18, 24, 33, 72, 61, 37; 358/127, 128,
        108, 903, 147

[56] References Cited

U.S. PATENT DOCUMENTS

| | | | |
|---|---|---|---|
| 2,721,990 | 10/1955 | McNaney | 178/DIG. 22 |
| 2,923,921 | 2/1960 | Shapin | 178/DIG. 22 |
| 3,098,119 | 7/1963 | Lemelson | 358/102 |
| 3,164,838 | 1/1965 | Heinrich | 352/69 |
| 3,413,626 | 11/1968 | Smith | 360/18 |
| 3,446,914 | 5/1969 | Hodge | 360/19 |
| 3,472,949 | 10/1969 | Banning | 360/18 |
| 3,514,537 | 5/1970 | Uemura | 360/10 |
| 3,518,366 | 6/1970 | Phan | 360/10 |
| 3,539,715 | 11/1970 | Lemelson | 358/102 |
| 3,580,998 | 5/1971 | Hammond | 358/108 |
| 3,603,729 | 9/1971 | Sperber | 178/DIG. 38 |
| 3,686,434 | 8/1972 | Lemelson | 178/DIG. 38 |
| 3,686,436 | 8/1972 | Camras | 360/18 |
| 3,701,846 | 10/1972 | Zenzefilis | 178/6.6 DD |
| 3,837,003 | 9/1974 | Justice | 360/18 |
| 3,849,776 | 11/1974 | Swynford-Lain | 360/18 |
| 3,925,815 | 12/1975 | Lemelson | 360/14 |
| 4,000,510 | 12/1976 | Cheney | 360/19 |
| 4,001,881 | 1/1977 | Folsom | 360/5 |

OTHER PUBLICATIONS

"Journal of SMPTE"; Feb., 1966, Nov. 1971.
"American National Standard", ANSI c98. 12-1975, copyright 1975 American National Standards Institute.

Primary Examiner—Bernard Konick
Assistant Examiner—Alan Faber
Attorney, Agent, or Firm—Fulwider, Patton, Rieber, Lee & Utecht

[57] ABSTRACT

Apparatus for selecting a particular signal group from a signal group sequence including a video recorder for sequentially recording the video signals from a plurality of surveillance television cameras, the signal group sequence comprising a sequential record of video fields interspaced in a predetermined order, together with a sequence code. During playback, a particular frame or field in the sequence is picked out according to the code associated therewith and is fed in parallel both to a video display and a disc storage device. At the completion of the selected frame the disc is unloaded into the display at its cycling rate to fill in the gap left by the discarded frames until the next frame sequence is initiated.

8 Claims, 7 Drawing Figures

VIDEO SEQUENCER-PROCESSOR

BACKGROUND OF THE INVENTION

1. Field of the Invention

The present invention relates to commutation and decommutation of electrical signals and more particularly to video signal communication.

2. Description of the Prior Art

The use of time-lapse video tape recorders in surveillance and security applications has gained wide acceptance. Generally, facilities like banks and other security-sensitive installations, are remotely monitored by time-lapse television cameras individually directed to view particular sections of the facility. In this manner, unattended monitoring of individual secured areas can be made and if an intrusion is suspected the record can then be played back. Most often, however, there is more than one distinct area which requires such unattended monitoring. Thus, more than one camera is typically involved in the surveillance of a given facility. In order to conserve the recording costs and to reduce the number of tapes and the requisite storage problems associated therewith, the multiple cameras typically all store their video record, in a commutated manner, on a video storage tape. Both in order to reduce tape bulk and to allow for a wide range of camera commutation, the most frequent technique of storing on tape is by way of an input sequence where the individual camera frames are interleaved in a predetermined order. Such commutation is typically performed by a sequencing switch either in a solid state form or actually mechanically driven.

Such expansion of the monitored field of view presents, during playback, a difficult viewing sequence to the person inspecting the tapes. Specifically, if the tape is played back normally the sequential frames stored thereon present sequentially differing fields of view with a resulting loss in coherency and with a resulting reduction in the speed at which such frames can be physically inspected.

One problem attendant to any decommutated viewing is that most video displays have a relatively short decay period and the frame display duration is therefore limited. Accordingly, where there are many cameras interspaced within each sequence cycle, the duration of the blank period during decommutation may be excessive to allow comfortable viewing.

SUMMARY OF THE INVENTION

Accordingly, it is one purpose and object of the present invention to provide for a frame filtering technique which selects one particular frame from a sequence of incoherent frames, on a repetitive basis, and which, during the time when the rejected frames are passing, repeats the selected frame.

Further objects of the invention are to provide a commutation device for selective display of a particular frame within a repetitive sequence of frames.

Yet further objects of the invention are to provide a commutation device which is convenient in use, easy to produce and requires few parts.

These and other objects are accomplished according to the present invention by superposing a four-bit binary coded signal covering the vertical sync period in the video signal originating at a surveillance camera, such binary signal being repeated with each frame of the camera. To facilitate discrimination of the binary code in the superposed signal, such signal is pulse-width modulated according to the binary code, the pulse-width binary code being inserted during the vertical blanking interval of the television surveillance camera. This binary code is developed by a variable length binary counter synchronized with the camera frame rate and reset at the end of the camera cycle. In this manner, a binary code is provided which, within each blanking interval, identifies the particular camera which is transmitting the video signal for recording. Both the video signal, and the binary code, is inscribed on a video tape. During playback a circuit functioning as an address filter selects a particular frame for display. To fill in the gap resulting from this address-filtering technique, the selected frame is concurrently passed to the display and to a disc storage device, where the disc storage device, at its cycle rate, fills in the display gap with a repetitive string of identical frames. By this arrangement displays having relatively short decay times can be used without any pronounced flicker.

The address filter circuit itself is configured as a coding matrix set to a selected count and fed into a comparator. This binary code is then compared with the superposed frame code to select the desired frame.

By way of this technique, each frame is identified and selected for presentation according to its code. During presentation any decay in the display may be up-dated by a disc when the frames not selected are passing through the tape reader. For purposes of clarity it should be understood that as used herein the term frame is used to indicate a single field of a television signal.

DESCRIPTION OF THE SPECIFIC EMBODIMENT

While the present invention is particularly suited for commutating and filtering of signals generated by a plurality of television cameras and is therefore described in this context, such description is for purposes of illustration only. It is to be understood that those skilled in the art may find uses other than those described herein and no intent to limit the scope of the invention is therefore expressed by the choice of this illustration.

Figure 1:
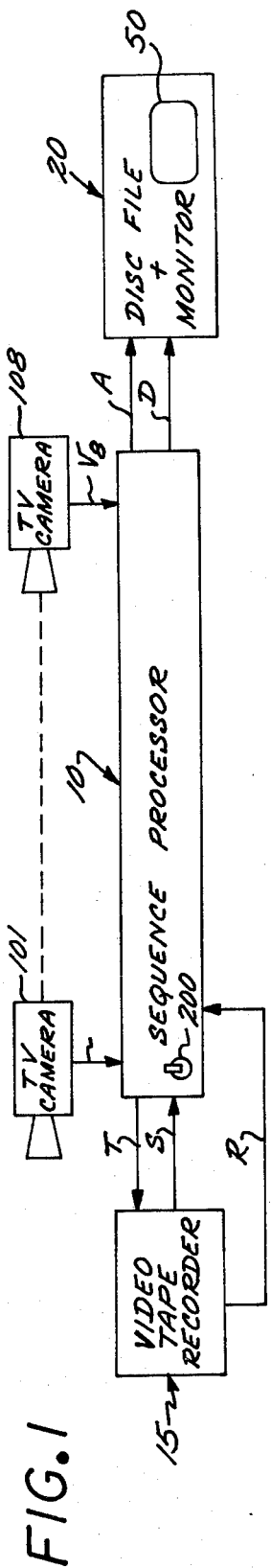
FIG. 1 is a generalized block diagram of a system constructed according to the present invention.

As shown in FIG. 1 a plurality of television cameras shown herein as television cameras 101–108, each provide a corresponding video signal V1–V8 to a sequence processor generally designated by the numeral 10. The sequence processor 10 is a modification of a sequential switch sold under the Model No. VS500 by Pelco Sales, Inc., 351 East Alondra Boulevard, Gardena, California, the modifications thereto being described in more detail hereinbelow. Sequence processor 10, according to functions to be described, is connected to provide a signal T to a video tape recorder 15, such as the video tape recorder sold under the Model No. 1360 by the Sanyo Corp. Recorder 15 provides a trigger signal S advancing the switch position to select the next camera and returns a video output signal R. The mode of operation of processor 10 is controlled by a manual switch 200 which is articulated between the record and playback mode according to the state of the recorder 15.

In the playback mode the recorder plays back the signal. The sequence processor 10 furthermore connects to a disc storage device 20 which, again, is conventional in the art and a disc recorder made under the Model No. MV-1U by Hitachi is suitable for the purposes herein which includes a monitor 50. More specifically, the sequence processor outputs a video signal A together with a disc trigger signal D to the disc recorder and monitor 20. Disc recorder 20, in turn, feeds back at a rate described herein, an output signal to the CRT display or a television monitor 50.

Referring back to the record mode, the sequence processor, according to means further to be described, sequentially selects the particular camera video signal V-1 through V-8 and superimposes a channel identification signal thereon. The combination of the video signal from the particular camera and the superposed channel signals are then sequentially transmitted on the signal T to the video tape recorder 15. For the purposes herein, sequence processor 10 is adapted to commutate eight such television cameras.

To identify the particular signals from such cameras 101-108, the channel identification signal comprises a serial four-bit binary signal, pulse-width modulated, the binary value of each pulse being determined by its width. The four pulse-width coded pulses are superposed onto the video signal during the vertical blanking interval and therefore do not interfere with the video presentation on the screen.

Thus, as the video signal from each camera is recorded on the recorder 15, the concurrent superposed binary identification signal is included therewith. This superposed camera identification signal, during playback, is then inspected in the manner similar to the inspection performed by an address filter, again, within the sequence processor 10. When a selected camera code matches a preselected code, the video signal is concurrently directly displayed on the monitor 50, and transferred into the disc stoage 20. Once loaded into the disc storage 20 the display 50 is cyclicly updated by the disc until the next frame matches up with the selected code. At this point the video record of the succeeding frame is overscribed onto the disc.

Figure 2:
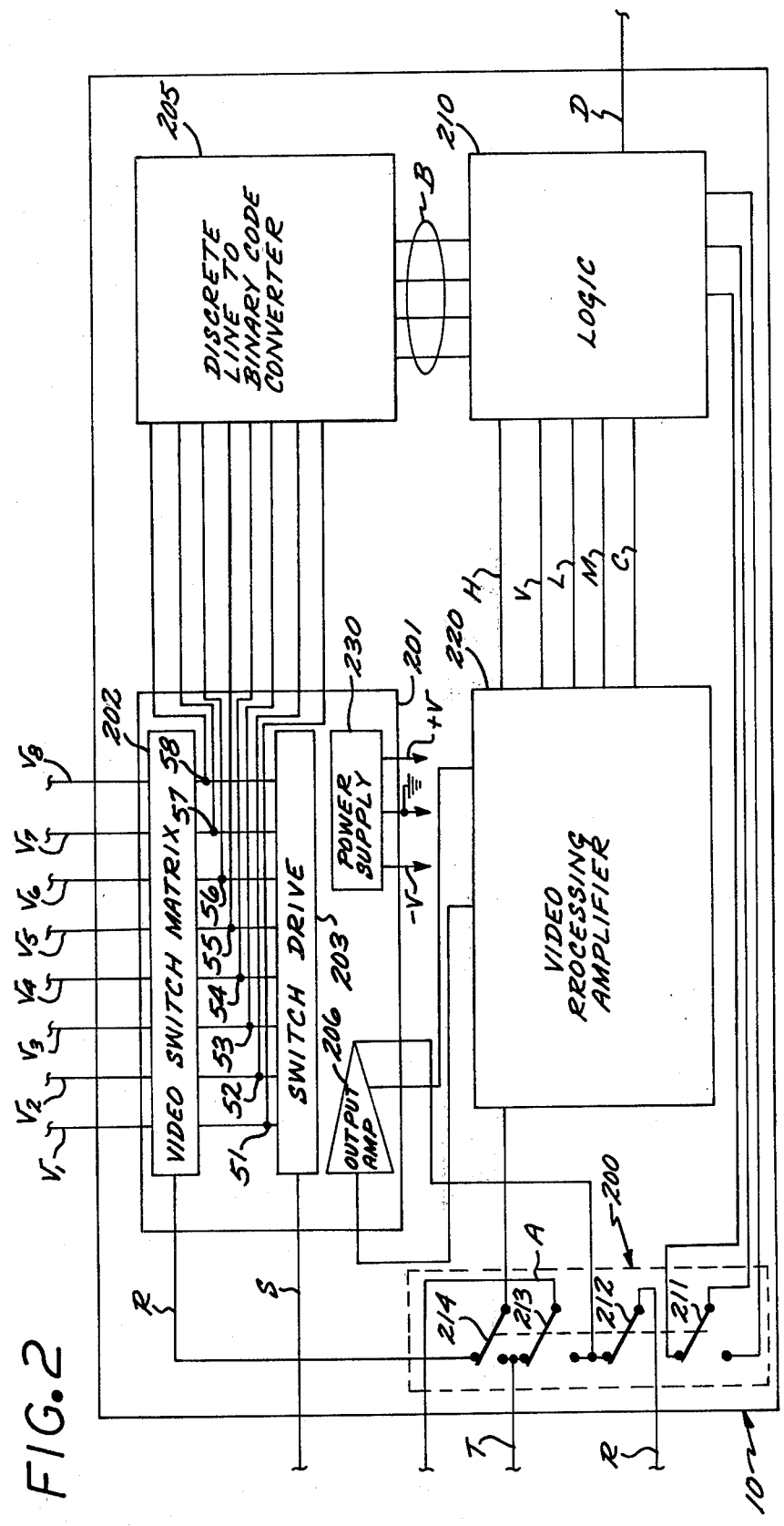
FIG. 2 is a detailed block diagram of a sequence processor useful with the system shown in FIG. 1.

As shown in more detail in FIG. 2, the sequence processor 10 includes, as its central stage, a switching section 201 which essentially conforms to the structure of the aforementioned Pelco VS-500 series sequential switch. While the structure of the VS-500 switch has been publicly disseminated, in the interests of clarity the subsections thereof are repeated herein. In particular, shown herein is a switch matrix 202 connected to receive the video signals V1-V8 from the television cameras 101-108. Included further is a switch drive circuit 203 providing a set of signals shown herein as signals S1-S8 which, in turn, enable the selection of a particular camera by switch matrix 202. To adapt this circuit to the uses herein, signals S1-S8 are brought out in parallel to an external binary code converter 205, the details thereof to be described hereinbelow. The code converter 205 converts the output of the switch drive circuit 203, or the corresponding signals S1-S8, into a binary signal on a four bit parallel signal branch B which, in turn, is connected to a logic stage 210. Logic stage 210, again in a manner to be described in detail hereinbelow, provides a serially coded pulse-width modulated signal C and a clipping or masking signal M, both signals being connected to a video processing amplifier 220 which, again, is subject to more detailed explanation hereinbelow. Connected also between the logic stage 210 and the video-processing amplifier 220 are the signal leads for conducting the vertical and horizontal synchronization of the video frame specifically designated as signal leads H and V, designating the horizontal and the vertical syncs respectively. In similar arrangement, a lead shown as lead L carries the data from the video-processing amplifier into the logic stage.

As will be described further, the logic stage 210 can be rendered operative in two modes; specifically, the record and the play mode. For this purpose, a switch 211 is connected thereto, forming one element of the switch assembly 200 which is exposed for manual articulation. Ganged in common with switch 211 are three other switches; 212, 213 and 214, switch 212 providing for circuit continuity between the output of an amplifier 206 within the switching section 201 and the video tape recorder 15, thus forming the path for the signal T. The input to amplifier 206 is generated at one of the outputs of the processing amplifier 220, again, in the manner to be described.

The articulation of switch 200 thus controls the selection of the record or play mode of operation. Switch 213, when in the record mode as shown, provides a path from the recorder 15 to the disc 20. In its alternative position switch 213 connects the output of amplifier 206 to the disc and therefore the monitor 50. The arm of switch 213 therefore forms the path for the signal A. Switch 214 in the record mode brings out the signal T from the switch matrix 202 and in the playback mode selects the output of recorder 15, from which switch 213 is now lifted, thus providing an input to amplifier 220 which corresponds to signal T or R. In this manner the monitor 50 is active both in the record and playback modes, providing a visual check in the record mode over the operation of the system. The concurrent articulation of switch 211, according to means to be described, also controls the operation of the logic stage 210 to a corresponding operational state.

Figure 3:
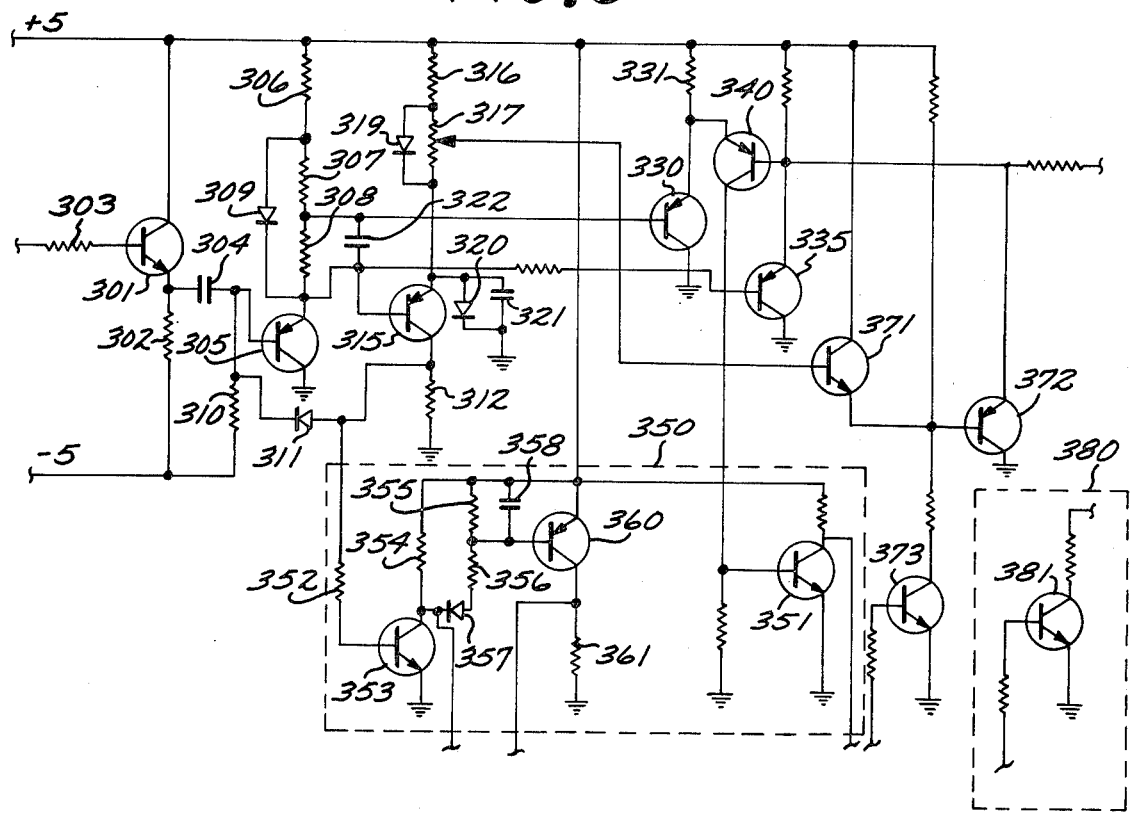
FIG. 3 is a circuit diagram of an amplifier useful with the system shown in FIGS. 1 and 2.

At this point, the detail description of the various components will now be taken up. Specifically, as shown in FIG. 3, the video processing amplifier 220 is connected to receive a +V, −V and ground signals from a power supply 230 included in the switching section 201. Disposed between the +V and −V signals is a transistor 301 in series with an emitter-resistor 302, forming an emitter-follower circuit. The base of transistor 301 is connected across a base resistor 303 to the arm of switch 214. Transistor 301 is an NPN transistor and therefore develops at the emitter thereof, a signal which corresponds to the video signal either from the switching matrix 202 or from the video tape recorder 215. This signal is connected across a coupling capacitor 304 to the base of a PNP transistor 305 which, at its emitter, is connected across a resistance series to the signal +V and at its collector is connected to ground. The emitter series network comprises resistors 306, 307 and 308, where resistors 307 and 308 are connected across a diode 309 in forward bias. The base of transistor 305, furthermore, is connected across the resistor 310 to the −V signal and to the cathode of a diode 311.

The anode of the diode 311 is, in turn, connected across a resistor 312 to ground and to the collector of yet another PNP transistor 315. The emitter of transistor 315 is connected to a series network comprising resistors 316 and 317 where resistor 317 is again shunted by a diode 319. Diodes 309 and 319 set a reference voltage across the corresponding parallel resistor. The emitter of transistor 315 is connected across a Zener diode 320 in parallel with a capacitor 321 to ground. Similarly, resistor 308 is shunted by capacitor 322, the connection between resistors 307 and 308 driving, in turn, the base of a further PNP transistor 330. Transistor 330 is, again, connected between signal +V across an emitter-resistor 331 and ground. Connected across transistor 330 is yet another PNP transistor 340 which, at its collector, drives the base of a transistor 351 where transistors 330, 340 and 351 form a code detection circuit forming part of the amplifier. Transistors 305 and 315 and diode 311 form a sync separator and clamp circuit. The stripped sync cignal appearing at the anode of diode 311 is connected by way of a base resistor 352 to control the conduction of a transistor 353 connected in a common emitter mode across a collector resistor 354 to the signal +V. Connected in parallel across resistor 354 is a series circuit comprising resistors 355 and 356 and a diode 357. Resistor 355 furthermore includes connected thereacross a capacitor 358, the juncture between resistors 355 and 356 controlling the base of yet another PNP transistor 360. Transistor 360 is connected to the signal +V at the emitter thereof and across a collector resistor 361 to ground. The collector terminal of transistor 360 therefore provides the vertical sync signals V while the collector-terminal of transistor 353 provides the horizontal sync signal H described hereinabove.

To suppress the video signal or any signal spikes occurring as a result of noise pick-up and other phenomena during the signal segment at which the code is superposed, the signal output from a resistor 317 is connected to the base of an NPN transistor 371 connected to the signal +V and driving, by the emitter, the base of yet another PNP transistor 372. Transistor 372 is connected between the emitter of transistor 335 and ground, and therefore, when rendered conductive will suppress the signal output therefrom. The conduction of transistor 372 is controlled by yet another transistor 373 connected between the base of transistor 372 and ground and controlled in conduction by the signal M from the logic stage 210.

Transistor 301 serves to isolate the switching matrix 202 from the low input impedance of the clamp circuit comprising transistor 305. Specifically, transistor 305 is normally conducting while transistor 315 is rendered conductive only during the sync pulses. When transistor 315 is conducting, diode 311 maintains the base of transistor 305 at a marginally conductive level. The collector of transistor 315 thus provides an isolated sync signal which is amplified and inverted by the transistor 353. The signal then appearing at the output of transistor 353 is separated by the circuit around transistor 360 while the video signal is brought out through transistor 335 when not suppressed.

In the record mode, at the beginning of each frame a positive going signal at the base of transistor 373 causes the transistor 372 to supress the video output. This clipping mode is terminated after the identification code is added. During the playback mode, however, the signal is clipped until code coincidence is found.

Also included in the amplifier 220, is a code amplifier stage 380 which comprises a common emitter transistor 381 driven at the base by the signal C and providing an output to amplifier 206.

Figure 5:
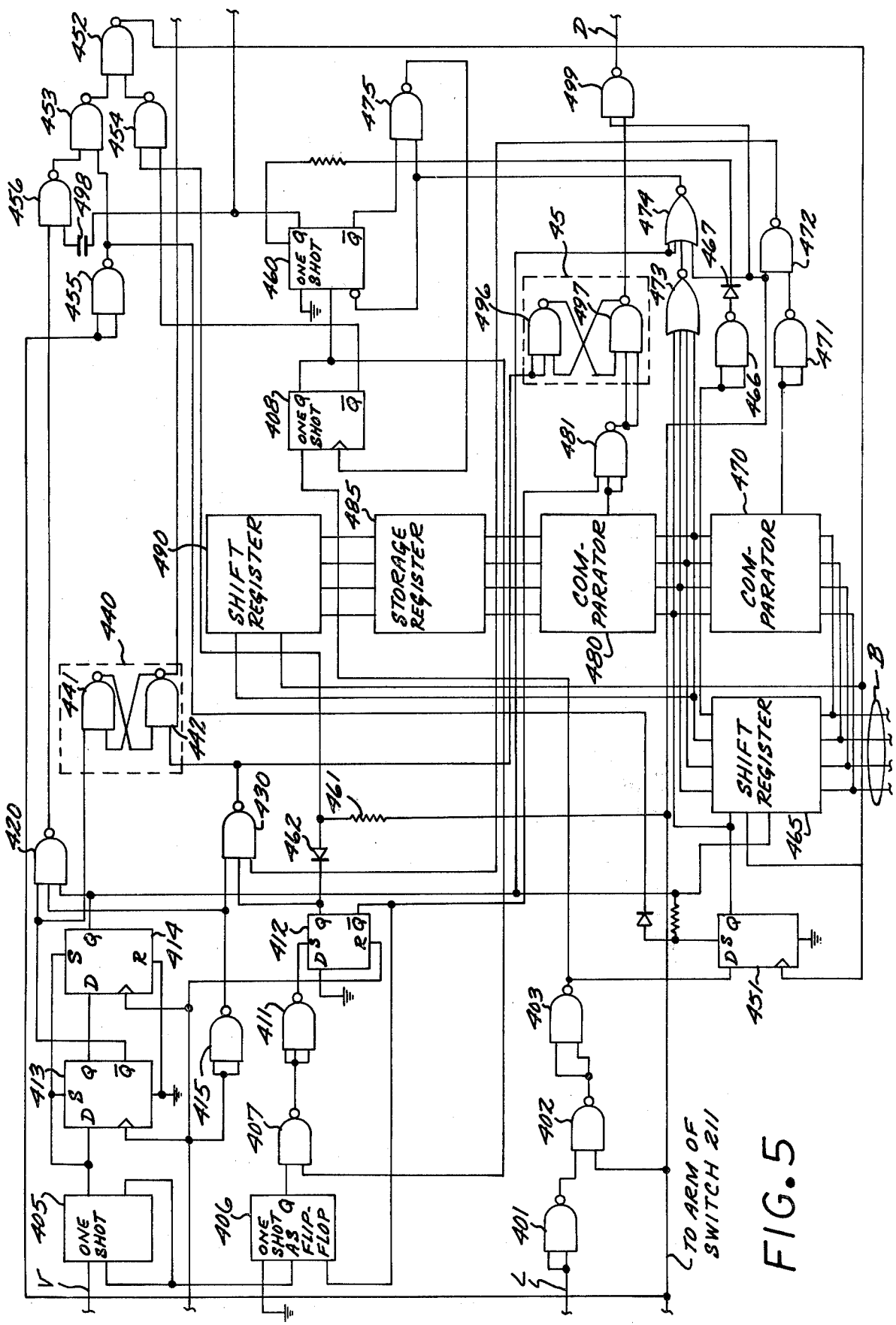
FIG. 5 is a logic diagram adapted for use with FIG. 2.

At this point, reference is made to FIG. 5 for the specific description of the logic stage 210. As previously disclosed, the output signal L appearing at the collector of transistor 351 of the amplifier 220 and representing the code group extracted from the playback signal, is applied to NAND gate 401 which is connected as an inverter. The output of NAND gate 401 is collected with the signal on the arm of switch 211 at the inputs of yet another NAND gate 402 which, in turn, is inverted by a NAND gate 403 at its output. Thus, when switch 211 is thrown as shown in FIG. 2 to the record mode, one input to gate 402 is low, blocking all signal transmission thereacross to thus suppress the code. When, in the alternative, switch 211 is thrown to the play mode, a positive voltage is applied to the second input of gate 402 providing a signal at the output of gate 403 which represents an inverse of the signal at the input of gate 401.

The basic timing of the aperture for the impression or superposition of the code is provided by way of a one-shot multivibrator 405 which is triggered by the vertical sync signal V from the video processing amplifier 220, and which in turn, sets flip-flop 406. Flip-flop 406 is a one-shot multivibrator connected as a flip-flop. The Q output of one-shot 406 is collected at the input of a NAND gate 407 with the Q output of yet another one-shot 408 which, in turn, is set by the output of NAND gate 475 or inverter 403.

The output of gate 407, inverted through yet another NAND gate 411, is connected to the set terminal of a D-type flip-flop 412 which, in turn, is reset by the signal H, or the horizontal sync signal again generated in amplifier 220. This signal H is also connected to the clock terminal of flip-flop 413 which is connected both at the set and the D terminals to the Q output of the one-shot 405. The Q output of flip-flop 413 is, in turn, connected to the D terminal of a flip-flop 414 again set by the same Q signal and clocked by signal H. The $\overline{Q}$ output of flip-flop 413 is collected with the Q output of flip-flop 414 and the inverted signal H, as inverted through a NAND gate 415, at the inputs of yet another NAND gate 420. In a similar manner, the output of gate 415 is also connected with the Q output of the D flip-flop 413 and the output of gate 430 are respectively the set and reset inputs of a NAND gate latch 440, shown herein as a latch comprising two NAND gates 441 and 442 configured in the conventional feedback circuit, gate 441 feeding back its output to one of the inputs of gate 442, while gate 442, in a similar manner, driving one of the inputs of gate 441. The output of the gate 442 provides the signal M described hereinabove.

The signal from the inverting gate 403 is also connected to the D input of a flip-flop 451. Flip-flop 451 is clocked by the output of a NAND gate 452 which collects the output of two NAND gates 453 and 454 at the inputs thereof. Gate 453 collects at one input the inverted signal from the wiper of switch 211, the inversion being achieved by yet another NAND gate 455 connected in an inverter mode. The other input to gate 453 is the output of a NAND gate 456 which, at its inputs, collects the output of gate 420 and the switching spike of yet another one-shot 460. One-shot 460 is driven by the Q output of the one-shot 408. Gate 454 similarly collects the arm of switch 211, through a resistor 461, or the Q output of flip-flop 412 through a diode 462 with the $\overline{Q}$ or the complement output of one-shot 408. The Q output of flip-flop 451 serves as the input to a shift register 465 whose parallel inputs are the signal branch B from the binary code converter 205. Shift register 465 is a four-bit shift register having the most significant bit position thereof tied, and inverted through a NAND gate 466 in series with diode 467, to the timing terminals of the one-shot 460. The Q output of flip-flop 451 and the lesser three significant outputs of shift register 465 are compared by comparator 470 with the binary signal on branch B. The output of comparator 470 is inverted by NAND gate 471 and fed to yet another NAND gate 472 which, at its other input, is connected to the arm of switch 211. Gate 472 then provides the third and hereinabove, as yet, undefined input to the NAND gate 430 to thus complete the loop. Concurrently the outputs of shift register 465 are all collected at a NOR gate 473, the output of gate 473 being collected with the signal at the arm of switch 211 and the Q output of flip-flop 414 at a NOR gate 474. Gate 474 then provides the reset signal to the one-shot 460 and is collected at a NAND gate 475 with the $\overline{Q}$ output of the same one-shot. The output of gate 475 is then looped back as a negative going trigger input to the one shot 408.

The outputs of shift register 465 and flip-flop 451 are concurrently fed to yet another comparator 480 which, at the other inputs, receive the parallel outputs of a storage register 485. Register 485, in turn, is loaded from a four-bit shift register 490 which accumulates the second most significant bit position of the shift register 465. The comparison output of the comparator 480 is collected with the $\overline{Q}$ output of the flip-flop 412 at the inputs of yet another NAND gate 481. Gate 481 then controls the set input of a latch circuit 495 comprising, again, two interlooped NAND gates 496 and 497, the reset input to the latch being developed by the output of gate 430. The output of latch 495 is then combined with the signal on the arm of switch 211 in a NAND gate 499 to provide the enable signal D for data transfer into the disc storage 20.

By way of the foregoing description of parts and arrangements thereof of the logic stage 210, the horizontal sync pulses and the stripped vertical sync pulses, provide the basic timing scheme thereof. Whether in the playback or the record mode, the vertical sync signal V triggers the one-shot 405 to be set. Concurrently, the latch 440 is set. The latch 440 then provides the clipping signal M to the video processing amplifier 220 to thus blank out all video signals.

In the record mode the pulse generated by the one-shot 405 is set to a particular width according to means known in the art. This pulse provides the time lag necessary to insure that the code group appearing during the vertical blanking period will occur after the end of the vertical sync pulse V. After the completion of the pulse from one-shot 405, flip-flop 413 is cleared by the next horizontal timing signal.

At this time, shift register 465 is programmed for parallel entry by the Q output of flip-flop 414. The following H timing pulse is through gates 420, 456, 453 and 452 to load shift register 465 with the four-bit identification code B and to set flip-flop 451. The completion of this H pulse causes flip-flop 414 to reset thus turning off gate 420 and programming shift register 465 for serial entry. The combination of flip-flop 451 and the shift register 465, provides a five-bit wide shift register where any one high bit in the lesser significant four bits causes gate 473 to go low at its output thus allowing a high at the output of gate 474, setting the multivibrators 408 and 460 into oscillation. The period of oscillation of these two multivibrators is controlled, in turn, by the most significant bit position of shift register 465. Specifically it is the series connection of the most significant bit through inverter 466 and diode 467 which determines the current to the time-out circuit of the multivibrator 460. The looping of the output of gate 475 to the input of the one-shot 408 accomplishes this oscillatory function. The time-out circuit of one shot 408 is set to be approximately half-way between the high and the low time-out periods of the one-shot 460. Thus, continued oscillation will be maintained and pulse width controlled by the signal level at the most significant bit position of shift register 465. One shot 460, by way of a coupling capacitor 498, is tied to pass the signal transient thereof into the input of gate 456 and through gates 453, 454 and 452 thus providing the clocking signal to the five-stage shift register comprising flip-flop 451 and shift register 465. At the completion of four shift pulses thus clocked out, gate 473 goes high and through the inversion of gate 474 stops all further oscillation of the looped one-shots 408 and 460. In this manner, it is assured that only four bits of code are provided at the output of the 460 multivibrator, thus identifying the particular frame. Subsequently, the next horizontal pulse is gated through gate 430 resetting latch 440 and ending the video clipping signal M.

In the play mode, flip-flops 413 and 414 are similarly reset by the horizontal pulses. In this mode, however, gate 453 inhibits the loading of the code data into shift register 465. Instead, the play back signal code data from processing amplifier 220 on signal lead L is gated through gate 402 and inverted by gate 403 for application as a D input to flip-flop 451 and as a trigger signal to one-shot 408. The $\overline{Q}$ output of one-shot 408 is then gated through gates 454 and 452 to provide the requisite clock pulses to the shift register comprised of flip-flop 451, register 465, and register 490. The time-out circuit of one-shot 408 is set as hereinabove mentioned to be just larger than the zero pulse width and just smaller than the one pulse width, with the result that the flip-flop 451 acts as a pulse width detector. Specifically, it is to be noted that it is the trailing edge of the negative going signal from one-shot 408 which clocks the flip-flop 451 and therefore it is the end of the time-out function of the one shot that clocks this flip-flop. Thus, in case of a short pulse, the clocking signal occurs after the pulse has discontinued and in case of a long pulse, the clocking signal is concurrent with the pulse to thus set the flip-flop. After all the successive pulses are read into the shift register and concurrently into the comparator 470, the output of the comparator will be low if there is disagreement between the signal branch B and the code sequence appearing thereon. If there is an agreement gate 472 enables gate 430, thus allowing the next horizontal pulse to reset latch 440, terminating the clipping signal M until the next vertical pulse appears. In this manner, only the selected play-back signal is allowed to reach the monitor or disc storage system, all other signals being clipped such that only synchronizing pulses are allowed to pass. When a disc storage device is utilized to eliminate flicker, a command to update disc contents should precede the updating video signal sufficiently to allow the disc logic system to perform properly and to insure minimum horizontal synchronization transients. Shift register 490, storage register 485 and comparator 480 serve to generate an anticipatory update trigger pulse to the associated disc storage device. The second most significant Q output of shift register 465 represents the most significant bit of the playback channel identification code. In addition to feeding the most significant input lines of comparators 470 and 480, it feeds the D input of shift register 490. Thus, as each new code group is read in, the preceding code group is shifted into shift register 490. The next horizontal sync signal H will then reset latch 440 if there is a comparator at the output of comparator 470. When latch 440 resets, the contents of shift register 490 are transferred to register 485. At this time, the contents of register 485 do not compare with the incoming code and the output of comparator remains low. At a later time, however, the new data being read in will compare with the data stored in register 485. This is an indication that the next code will be the selected code, and the output of comparator 480 goes high. This high signal is inverted by gate 481 and sets the latch 495, the output of gate 497 being gated through gate 499 to command the disc storage device to update its contents.

Figure 6:
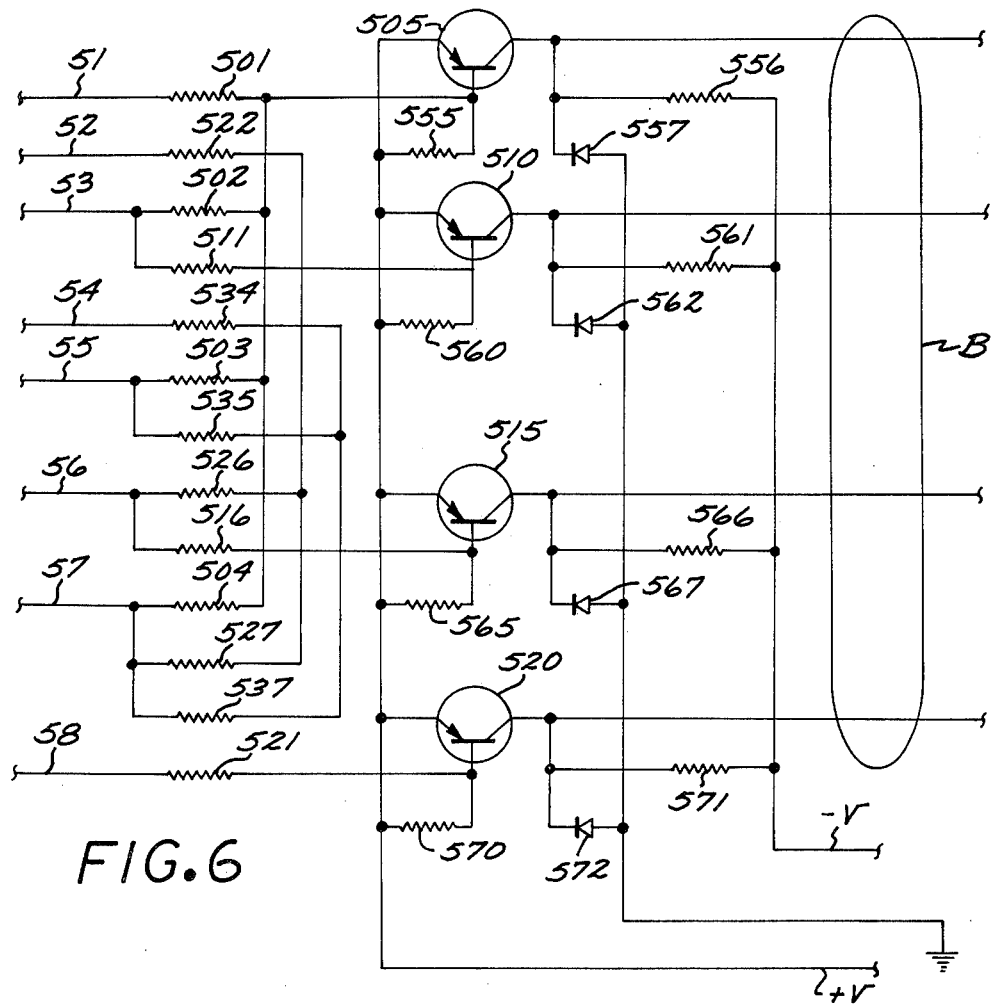
FIG. 6 is a binary code converter adapted for use with the device shown in FIG. 2.

At this point the details of the code converter 205 will be taken up, with particular reference to FIG. 6. As shown in this figure the switch selection signals S1–S8 are converted to a binary code by way of preset interconnections. More specifically, switch drive 203, in its normal mode of operation, selects a particular camera signal by pulling down one of the signals S1–S8 to the -V level. All other ones of these signals remain at the +V level. The code converter circuit 205 then converts this single signal pull-down into a binary code of logical "0"s and "1". This is accomplished by connecting signal S1 across an input resistor 501 to the base of a PNP transistor 505. The base terminal of transistor 505 is also connected to signal S3 across an input resistor 502 and to signals S5 and S7 across corresponding resistors 503 and 504. Transistor 505 is connected at its emitter to the signal +V and at its collector across registor 556 to signal -V and is driven into saturation by the pull-down of any one of the signals S1, S3, S5 or S7. The collector output of transistor 505, when in saturation, approximates the +V signal level to provide a logical "1" at the corresponding signal lead within the signal branch B. Similarly, signals S2, S6, and S7 are connected across resistors 522, 526, and 527 to the base of transistor 510 which provides the second level of binary code in the branch B. Signals S4, S6 and S7 are connected across resistors 534, 516 and 537 to the base of transistor 515 which provides the third level of binary code in the branch B. The fourth level of code in the branch B is provided by a similar connection of signal S8, across resistor 521 to the base of transistor 520. These interconnections establish the code on the signal branch B which, in four-bit form, reflects the channel number of the selected signals S1–S8.

In addition to the above connections the code converter 205 further includes the necessary base bias connections effected herein by resistors 555, 560, 565 and 570 connected to the +V source. Similarly each collector path of transistors 505, 510, 515 and 520 includes a collector resistor respectively shown as resistors 556, 561, 566 and 571 and clamping diodes 557, 562, 567 and 572.

With the foregoing description of the parts, the operation of the invention will now be taken up. By reference to FIGS. 1 and 2, the various television cameras 101–108 are selected for recording by the video switch matrix 202. Matrix 202 is, in turn, gated for proper connection by the switch drive 203, particularly by the signal leads S1–S8 thereof. These same signal leads provide the input to the binary code converter 205 which, across the signal branch B, side loads into shift register 465 and comparator 470 in the logic stage 210. The shift register 465 is loaded by the flip-flop 451 which, in turn, is controlled either by the vertical sync pulse as gated by the one-shot 405 or by data out of gate 403. During the data input, flip-flop 451 acts as a pulse width discriminator shifting in a binary count into register 465 according to the "0" and "1" discrimination of the pulse width. This same sequence of pulses is applied to the comparators 470 and 480. The second most significant bit of shift register 465 is also connected to shift register 490 and as each new four-bit group is fed into the shift register 465 the previous code group is loaded into register 490. The next horizontal sync signal H will then reset latch 440 if there is a compare at the output of comparator 470. When latch 440 is reset the contents of register 490 are transferred to register 485 allowing the amplifier 220 to transfer the video signal both to the display 50 and the disc storage 20. The disc will then cyclically repeat the same video signal to the display until a different frame is selected.

It should be noted that during the play back mode, manual selection of the camera signal to be displayed is achieved by manipulation of the standard panel switches located on the Pelco VS500 equipment. These switches seem to allow the operator, in normal operation, to bypass any channels he may so desire, or to select a single channel for continuous observation. It is this latter function which is used to determine which, of a multiple camera recording, is to be displayed.

Figure 4:
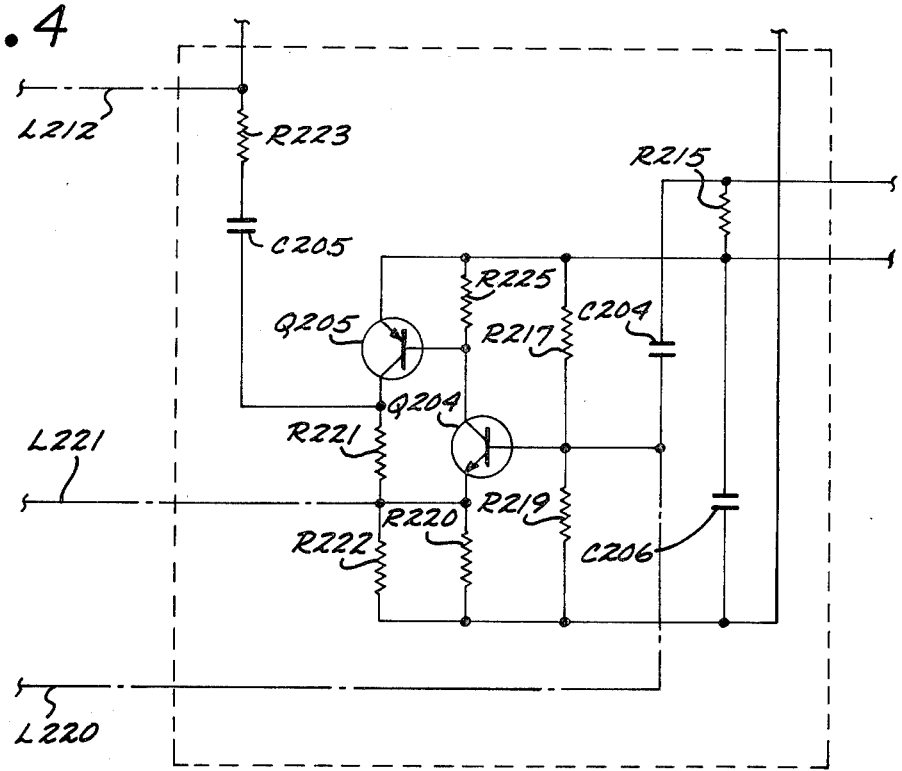
FIG. 4 is a circuit diagram illustrating the modification of a prior art device for use as the sequence processor shown in FIG. 2.

To complete these functions certain modifications to the Pelco sequential switch VS500, shown herein as the sequencing switch 201, are necessary. Specifically, as shown in FIG. 4, it is the connections of output amplifier 206 that are altered for the purposes herein. Accordingly, only that portion of the circuit is illustrated, reference to be made for the details of circuit completion to the various publications and particularly to the "Instruction Manual, Sequential Switchers, Model Vs500 Series" by Pelco, Form 800 6/75. In this publication there is shown a single circuit diagram which includes a section designated "Output Amplifier". For purposes of clarity the same numbering of parts is maintained in FIG. 4. In this figure the top end of a resistor R223 is connected to a common contact between switches 212 and 213 and is therefore identified as the output lead L212. The input to the amplifier originating in the video processing amplifier 220 is shown as a lead L220 connected to the base of transistor Q 204. The code input to this amplifier connects to the emitter of transistor Q204 and is shown herein as lead L221. These leads provide the necessary connections of the system between a prior art device and the circuits in combination therewith.

Figure 7:
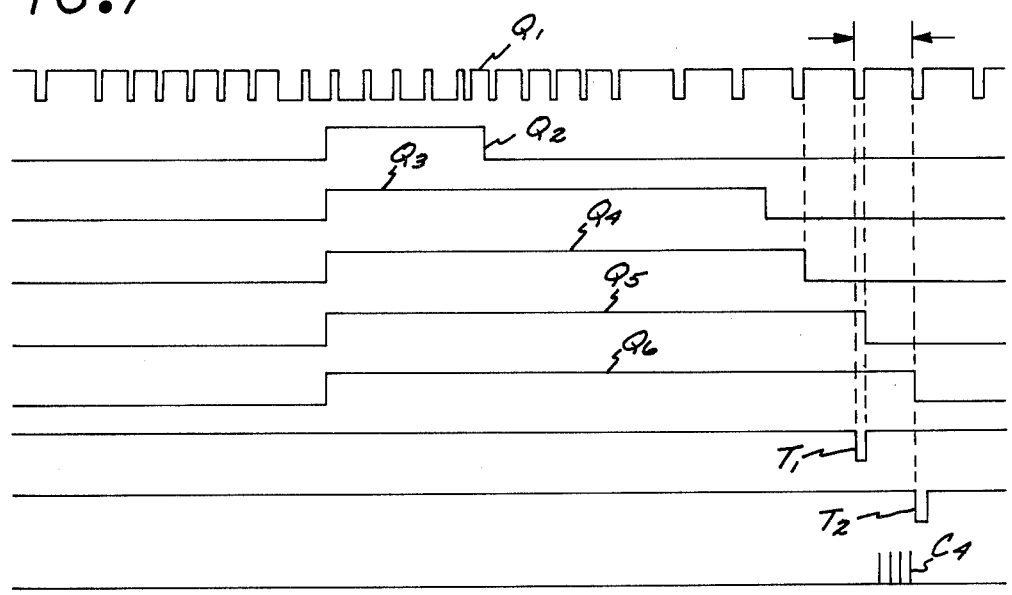
FIG. 7 is an illustration of a plurality of wave forms originating at selected points in the system described herein.

By way of further illustration in FIG. 7 some of the waveforms of the system are set forth. Specifically, signal trace Q1 illustrates the horizontal sync signal H and signal trace $Q_2$ is the vertical sync pulse V. Signal traces $Q_3$ and $Q_4$ are the Q outputs of one-shot 405 and flip-flop 413 respectively, while traces $Q_5$ and $Q_6$ correspond to the timing apertures of flip-flop 414 and latch 440. By way of these signal traces, two aperture spikes $T_1$ and $T_2$ are developed at the output of gates 430 and 420 which set the time period within which the four bit code $C_4$ is developed by the one-shot 460. This sets the timing sequence for the record mode.

In a similar manner the timing sequence in the play back mode is achieved. Thus the system provides a means for pulse width encoding and decoding which selectively identifies a sequence of frames which is convenient in use and which does not interfere with the video signal.

Obviously many modifications and variations to the above disclosure can be made without departing from the spirit of the invention. It is therefore intended that the scope of the invention be determined solely dependent on the claims hereto.

I claim:

1. A system for commutating and decommutating a frame by frame sequence of a plurality of surveillance television cameras, comprising:
   sequencing means connected to said television cameras for sequentially selecting ones thereof for recording;
   coding means connected to said sequencing means for developing serial code groups in corresponding relationship with the selection of said cameras, said serial code groups each having an individual code combination for each said camera;
   superimposition means connected to said sequencing and coding means for interposing the individual code combination for each camera within the vertical interval of each field received from said cameras;
   recording means connected to said superimposition means to serially record the signals in said fields from said cameras with said combinations interposed therein in a single recording channel, said recording means including a recorder that controls the rate of recording said signals and also is connected to said sequencing means to advance sequential selection of said cameras at the same rate, thereby achieving recordation of said signals for time lapse video signal storage;
   playback means selectively connected to said recording means for selecting individual ones of said camera output signals according to a predetermined one of said individual code combinations that are interposed in the vertical intervals of fields stored in said recording means;
   video display means connected to said playback means for producing a visual image corresponding to said selected camera signals; and
   storage means connected to said playback and display means for storing said selected camera signal and cyclically repeating said signal to said display means.

2. The system of claim 1 wherein said coding means further comprises:
   a code convertor for establishing unique binary code bit combinations in association with each of said cameras;
   shift register means for serializing code bit combinations;
   an interval generating one-shot multi-vibrator which establishes time intervals between code bits during recording and which sets a pulse width limit for bit value detection during playback; and
   a bit value one-shot multi-vibrator which generates pulses during recording of widths determined by said serialized bit values of said code group.

3. The system of claim 2 wherein said playback means further comprises:
   clipping means for inhibiting the transmission of said recorded camera field signals from said recording means to said video display means;
   a pulse width discriminating circuit connected to said recording means to receive said code bit combinations interposed in said fields and operative to detect each code associated with each field;
   a comparator operatively connected to said discriminating circuit;
   means for connecting a predetermined code to said comparator; and
   gating means enable by said comparator when a code bit combination matches said predetermined code to disable said clipping means.

4. Apparatus according to claim 1 wherein said camera output signals include a line by line video scan signal arranged in a two field per frame format with a horizontal sync signal occurring at the beginning of each line and a vertical sync signal occuring at the beginning of each field, and wherein:
   said coding means further includes logic means responsive to said vertical and horizontal sync signals for generating and detecting said serial code groups.

5. Apparatus according to claim 1 wherein said sequencing means includes signal generating means for generating an exclusive one of a plurality of switch drive signals and for driving said coding means; and
   said coding means includes a code convertor connected to said signal generating means for converting the signal therefrom into a binary code group.

6. Apparatus according to claim 1 wherein:
   said storage means comprises a disc storage device and includes a rotating storage medium and a read-write head adapted to selectively record and retrieve said camera signals on said medium, and said playback means further comprises;
   discriminating circuitry connected to said recording means to receive code bit combinations therefrom;
   a comparator operatively connected to said discriminator circuitry;
   means for connecting a predetermined code to said comparator;
   gating means for actuating said disc storage device to update the contents of said storage medium in response to a signal from said comparator when a code bit combination matches said predetermined code.

7. A system for recording and playing back field signals from a plurality of surveillance television cameras comprising:
   sequencing means connected to said television cameras for sequencially selecting ones thereof for recording;
   coding means connected to said sequencing means for developing serial code groups in corresponding relationship with the selection of said cameras, said serial code groups each having an individual code combination for each said camera;

superimposition means connected to said sequencing and coding means for interposing the individual code combination for each camera within the vertical interval of each field;

recording means connected to said superimposition means to sequentially record the signals in said fields from said cameras with said codes interposed therein in a single recording channel, said recording means including a recorder that controls the recording rate of said signals and also is connected to said sequencing means to advance sequential selection of said cameras at the same rate, thereby achieving recordation of said signals for time lapse video signal storage;

playback means selectively connected to said recording means for selecting individual ones of said camera output signals according to a predetermined one of said individual code combinations that are interposed in the vertical intervals of fields stored in said recording means; and video display means connected to said playback means for producing a visual image corresponding to said selected camera signal.

8. Apparatus according to claim 7 further comprising:

storage means connected to said playback and display means for storing said selected camera signal and cyclically repeating said signal to said display means, wherein an anticipatory circuit generates an update command to said storage means during playback, said command being generated prior to the beginning of the selected camera output signal.

* * * * *